(12) United States Patent
Petilli et al.

(10) Patent No.: US 11,659,260 B2
(45) Date of Patent: May 23, 2023

(54) TWO-WAVEBAND IMAGE ACQUISITION DEVICES AND METHODS OF USE

(71) Applicant: OWL AUTONOMOUS IMAGING, INC., Fairport, NY (US)

(72) Inventors: Eugene M. Petilli, Victor, NY (US); Christopher S. Urban, Fairport, NY (US); Francis J. Cusack, Jr., Raleigh, NC (US)

(73) Assignee: OWL AUTONOMOUS IMAGING, INC., Fairport, NY (US)

( * ) Notice: Subject to any disclaimer, the term of this patent is extended or adjusted under 35 U.S.C. 154(b) by 557 days.

(21) Appl. No.: 16/830,135

(22) Filed: Mar. 25, 2020

(65) Prior Publication Data

US 2020/0389606 A1   Dec. 10, 2020

Related U.S. Application Data

(60) Provisional application No. 62/823,731, filed on Mar. 26, 2019.

(51) Int. Cl.
*H04N 5/33* (2023.01)
*G01S 17/86* (2020.01)
(Continued)

(52) U.S. Cl.
CPC ......... *H04N 23/11* (2023.01); *G01C 21/1652* (2020.08); *G01J 5/10* (2013.01); *G01S 7/4816* (2013.01); *G01S 7/4863* (2013.01); *G01S 17/00* (2013.01); *G01S 17/18* (2020.01); *G01S 17/86* (2020.01); *G01S 17/894* (2020.01); *G05D 1/0214* (2013.01); *G05D 1/0289* (2013.01); *G01J 2005/0077* (2013.01); *G01J 2005/106* (2013.01)

(58) Field of Classification Search
CPC ....... H04N 5/332; G01C 21/1652; G01J 5/10; G01J 2005/0077; G01J 2005/106; G01J 5/20; G01S 7/4816; G01S 7/4863; G01S 17/00; G01S 17/18; G01S 17/86; G01S 17/894; G01S 7/4814; G01S 7/4876; G01S 17/931; G05D 1/0214; G05D 1/0289

See application file for complete search history.

(56) References Cited

U.S. PATENT DOCUMENTS 9,184,194 B2 * 11/2015 Cellek ................... H01L 31/105
10,389,922 B2 * 8/2019 Takita ................... H04N 5/2253
(Continued)

*Primary Examiner* — Sath V Perungavoor
*Assistant Examiner* — Tyler B Edwards
(74) *Attorney, Agent, or Firm* — Loza & Loza, LLP

(57) ABSTRACT

A method for image acquisition includes receiving, by an image acquisition computing device, a digitized LiDAR image frame and a thermal image frame of a region of interest from a read out integrated circuit of an image acquisition device coupled to the image acquisition computing device. The LiDAR image frame and the thermal image frame are processed to detect one or more objects of interest located in the region of interest. The detected one or more objects of interest are correlated between the LiDAR image frame and the thermal image frame. The detected one or more objects of interest are identified based on the correlation between the LiDAR image frame and the thermal image frame. An integrated LiDAR and thermal image acquisition device is also disclosed.

18 Claims, 5 Drawing Sheets

(51) Int. Cl.
  *G01S 17/894* (2020.01)
  *G01J 5/10* (2006.01)
  *G01S 7/481* (2006.01)
  *G01S 17/18* (2020.01)
  *G01S 7/4863* (2020.01)
  *H04N 23/11* (2023.01)
  *G01S 17/00* (2020.01)
  *G05D 1/02* (2020.01)
  *G01C 21/16* (2006.01)
  *G01J 5/00* (2022.01)

(56) References Cited

U.S. PATENT DOCUMENTS

| | | | | |
|---|---|---|---|---|
| 10,445,599 | B1* | 10/2019 | Hicks | G05D 1/0246 |
| 2018/0284274 | A1* | 10/2018 | LaChapelle | G01S 7/483 |
| 2019/0346537 | A1* | 11/2019 | Krelboim | G01S 17/931 |
| 2021/0190962 | A1* | 6/2021 | Maimon | G01S 17/95 |

\* cited by examiner

TWO-WAVEBAND IMAGE ACQUISITION DEVICES AND METHODS OF USE

CROSS-REFERENCE TO RELATED APPLICATION

This application claims priority to U.S. Provisional Patent Application Ser. No. 62/823,731, filed Mar. 26, 2019, which is hereby incorporated by reference in its entirety.

FIELD

This technology generally relates to two-waveband image acquisition device and methods of use thereof. More specifically, this technology relates to an integrated LiDAR and thermal image acquisition device, wherein the LiDAR operates within a first waveband and the thermal imaging operates within a different second waveband.

BACKGROUND

Autonomous vehicles represent one of the most exciting and promising technologies to emerge in the last decade, offering the potential to disrupt the economics of transportation. There is plenty of hype, but there can be no doubt that the emergence of fully autonomous vehicles will have a huge impact on people's lives, and the global economy.

Among the many technologies needed to construct fully autonomous driving systems, sensors play a central role. Sensors provide the eyes and ears of the car, allowing the vehicle to build an accurate model of the surroundings from which driving decisions can be made. Sensors will play an enabling role in achieving the ultimate goal of autonomous driving, i.e., fully driverless vehicles.

There are three types of sensor systems currently employed in self-driving cars; cameras, LiDAR, and RADAR. While these systems have enabled impressive advances in autonomous technology, no car manufacturer has yet achieved a fully autonomous vehicle. One of the most important barriers to full autonomy is the lack of cost-effective sensors capable of reliably mapping objects in the environment, including animate and inanimate objects, under all weather conditions.

Recognizing animate objects is important, especially when collision is unavoidable. When confronted with an imminent impact, the driverless vehicle needs to make an instantaneous decision about what object to hit. The ability to distinguish a child from a trash can is a matter of life or death. Making this kind of instantaneous decision is difficult enough in good weather, but with existing sensor technology it is far more difficult in bad weather.

Conventional LiDAR systems illuminate the environment with pulses of light, and then use silicon photodetectors to register the reflections. The resulting signals are then processed by algorithms to construct and categorize images. Current LiDAR systems are forced to illuminate with near infrared (herein NIR, in the range of 750 nm to 1.0 µm), a constraint imposed by the ubiquitous silicon photodetectors that typically do not respond well to wavelengths above 1 micron. The sun creates significant illumination in near infrared introducing the potential for powerful specular reflections and these short wavelengths are reflected and scattered by water vapor thereby attenuating transmissions in foul weather. Therefore, sun, rain, snow and fog impair the ability of conventional LiDAR systems to accurately characterize their surroundings. This is a serious barrier to full autonomy.

Current camera and LiDAR systems also have significant limitations in their ability to recognize animate or living objects. Typically, autonomous vehicle systems combine and process data from multiple sensors (e.g. camera and LiDAR) to build a 3D model of the environment. Such sensors working together are effective in fair weather at detecting animate objects like pedestrians and cyclists, but efficacy declines sharply when the objects are stationary, partially obscured or present in foul weather that blinds visible systems and scatters many NIR LiDAR systems. Object detection and recognition is also important in other applications, such as in military applications. By way of example, war fighters need advanced global integrated intelligence surveillance and reconnaissance (GIISR) capability, including better imaging than is available from current light detection and ranging (LiDAR) systems, in order to classify objects through obscurants. Two key limitations of current visible camera and LiDAR based systems include: (1) their inability to see through rain, snow, and fog, and (2) their inability to reliably distinguish animate and inanimate objects. Thus, improved imaging devices and methods are required to provide GIISR in military applications.

SUMMARY

A two-waveband image acquisition device includes a single focal plane array capable of sensing light from a first and a different second waveband, wherein the device is utilized for image acquisition of a LiDAR image frame of a region of interest in the first waveband and a thermal image frame of the region of interest in the second waveband, said frames coupled to an image acquisition computing device. The LiDAR image frame and the thermal image frame are processed to detect one or more objects of interest located in the region of interest. Using a single focal plane array predominately co-locates LiDAR and thermal photodetectors and therefore objects of interest are also optically correlated, which greatly simplifies the compute requirements of the acquisition computing device. The first and second wavebands being any two different wavebands of visible light (400 nm to 750 nm), near infrared (NIR, 750 nm to 1 µm), short wave infrared (SWIR, 1 µm to 2.5 µm), medium wave infrared (MWIR, 3 µm to 5 µm) and long wave infrared (LWIR, 8 µm to 14 µm).

An integrated LiDAR and thermal image acquisition device includes a light illumination source, and more specifically an infrared illumination source. The infrared illumination source being configured to provide infrared illumination within a first waveband of light over a region of interest. An at least one photodetector array of the image acquisition device is operable to receive reflected infrared beams, based on the infrared illumination from the infrared illumination source, from one or more objects of interest in the region of interest. The at least one photodetector array is also operable to receive radiated infrared beams within a different second waveband of light from the one or more objects of interest. The at least one photodetector array comprises a plurality of LiDAR photodetectors (first photodetectors) and a plurality of thermal photodetectors (second photodetectors). A read-out integrated circuit (ROIC) is coupled to the at least one photodetector array and is configured to generate a LiDAR image frame and a thermal image frame based on signals received from the at least one photodetector array. An image acquisition computing device is coupled to the read-out integrated circuit and comprises a processor, and a memory coupled to the processor, which is configured to execute one or more programmed instructions stored in the memory to receive a digitized LiDAR image frame and a thermal image frame of a region of interest from the read out integrated circuit. The LiDAR image frame and the thermal image frame are processed to detect the one or more objects of interest located in the region of interest. The detected one or more objects of interest are spatially correlated between the LiDAR image frame and the thermal image frame due to the photodetector configuration.

The present technology provides a number of advantages, including providing methods and devices that enable more effective and efficient object detection and recognition for a variety of applications including for autonomous vehicles. With examples of this technology, a single focal plane array (FPA) is provided that may combine, for example, SWIR wavelength (e.g., 1.55 μm) LiDAR, that is capable of propagating through water vapor without being substantially reflected, and MWIR wavelength (e.g., 3 μm to 5 μm) thermal imaging that uses heat signatures to detect objects, with particular ability to recognize animate objects, and further characterize the region of interest. By combining LiDAR operating within a first waveband and thermal imaging operating within a different second waveband into a single sensor in these examples, there is no need for post processing techniques to register or spatially combine signals from multiple disparate FPAs. Additionally, due to the photodetector configuration within the FPA, the LiDAR and thermal images are spatially registered, simplifying correlation between all objects detected in both wavebands within the region of interest. Data from this single sensor can be used to recognize, categorize, and distinguish living from non-living objects, even under inclement weather conditions. The result is a simpler and more economical system for detecting and categorizing objects in the vehicular environment that provides higher sensing performance.

Additionally, the present technology provides methods and devices that enable more effective and efficient object detection and recognition by utilizing separate wavelengths for LiDAR and thermal photodetectors. The present technology provides a read out integrated circuit (ROIC) that may include in-system configurable optimizations to create a multifunctional digital FPA capable of "flash" LiDAR (3D) and thermal imaging (2D) modes.

DETAILED DESCRIPTION

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Figure 1:
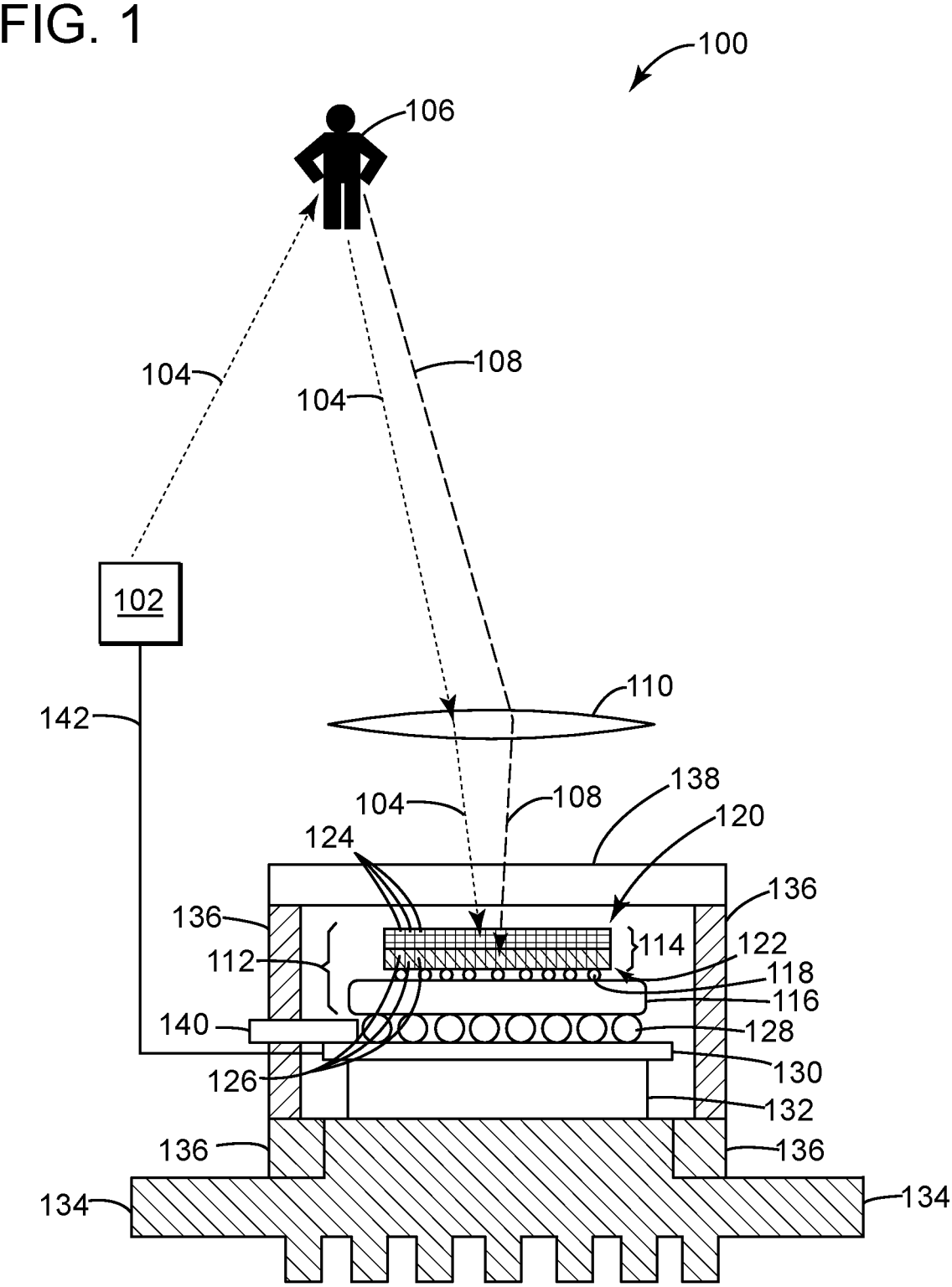
FIG. 1 is a simplified schematic illustration of an exemplary embodiment of a two-waveband image acquisition device in accordance with the present invention.

Referring to FIG. 1, a simplified schematic illustration of an exemplary embodiment of a two-waveband image acquisition device 100 in accordance with the present invention is depicted. The two-waveband acquisition device 100 includes an illumination source and any associated optics 102 for generating first light photons 104 within a first waveband to illuminate objects of interest 106 (such as a person) in a region of interest and to reflect the first light photons 104 back to the acquisition device 100. The acquisition device 100 is operable to simultaneously detect both the first light photons 104 reflected from the object 106 and second light photons 108 within a different second waveband that are at least one of radiated and reflected from the object 106.

In this specific example, the illumination source 102 is a laser (i.e., a LiDAR transmitter) and the two-waveband acquisition device 100 is an integrated LiDAR and thermal imaging acquisition device 100. Additionally, for this example, the first light photons 104 are within the SWIR waveband, and the second light photons 108 are within the MWIR waveband. The first light photons 104 may be used to determine a time of flight (ToF) of the first photons 104 from the laser 102 to the object and back to the acquisition device 100 in order to provide range data between the acquisition device 100 and the object 106 or depth data across the object 106. The second light photons 108 may be used to provide passive imaging data on the object 106.

Though in this example the first and second wavebands are the SWIR and MWIR wavebands respectively, the first and second wavebands may be any two different wavebands. For example, the first and second wavebands may be any two of visible light (400 nm to 750 nm), near infrared light (NIR, 750 nm to 1 μm), short wave infrared light (SWIR, 1 μm to 2.5 μm), medium wave infrared light (MWIR, 3 μm to 5 μm) and long wave infrared light (LWIR, 8 μm to 14 μm). It should be noted that: in the SWIR range, nearly all light emanating from an object is composed of reflected light. In the MWIR range, light emanating from an object may be composed of a mix of reflected and radiated light. In the LWIR range, nearly all light emanating from an object is composed of radiated light.

In one example, the laser 102 is a pulsed solid-state laser, which allows for flash LiDAR imaging, although the illumination source 102 may also be an erbium pulsed fiber laser, or a continuous source, by way of example only. The use of flash LiDAR imaging provides for an increased number of frames per second (FPS), by way of example, up to 240 FPS. In one example, a plurality of pulsed laser diodes are employed as the illumination source 102. In another example, the laser emits first light photons 104 in the waveband between 1.4 to 2.5 μm because these wavelengths are benign to the human eye and are not substantially reflected by most inclement weather.

The image acquisition device 100 also includes a main lens 110, which collects the first photons 104 reflecting from the object 106 and the second photons 108 radiating from or reflected from the object 106. The main lens 110 directs the first and second photons 104, 108 onto a focal plane array (FPA) 112 that is operable to detect and process both the first and second photons 104, 108.

The focal point array 112 includes an at least one photodetector array 114 that is operatively coupled to a read-out integrated circuit (ROIC) 116 through, for example, a die-bond interface 118. The die-bond interface 118 may include a eutectic bond interface, a solder bond interface, an adhesive bond interface or a glass bond interface. In this example, the FPA 112 is a multifunctional digital focal plane array (DFPA) capable of flash LiDAR three-dimensional (3D) and thermal two-dimensional (2D) imaging modes. The basic function of the FPA 112 is to convert optical image data provided by the first and second photons 104, 108 into electronic image data.

In this example, the at least one photodetector array 114 includes a first photodetector array 120 (referred to herein as a LiDAR photodetector array) and a second photodetector array 122 (referred to herein as a thermal photodetector array) stacked together. The first photodetector array 120 includes a plurality of first photodetectors 124 (referred to herein as LiDAR photodetectors) that are sensitive to the first photons 104. The second photodetector array 122 includes a plurality of second photodetectors 126 (referred to herein as thermal photodetectors) that are sensitive to the second photons 108. Each of the second photodetectors 126 of the second photodetector array 122 are substantially stacked directly below a first photodetector 124 of the first photodetector array 120, such that the first and second photodetector arrays 120, 122 are registered to each other. In other words, the first and second photodetectors 124, 126 are stacked such that the edges of each second photodetector 126 are substantially aligned vertically with edges of a first photodetector 124.

Each first photodetector 124 generates first output signals (i.e., a first photodetector photocurrent) in response to the first photons 104 hitting the first photodetector 124. Each second photodetector 126 generates second output signals (i.e., a second photodetector photocurrent) that is proportional to the number of second photons 108 hitting the second photodetector 126.

Though, in this exemplary embodiment, the at least one photodetector array 114 is illustrated as two stacked photodetector arrays 120, 122, other configurations of the at least one photodetector array 114 are also within the scope of this invention. For example, the at least one photodetector array 114 may be one photodetector array having a plurality of photodetectors that are sensitive to both the first and second photons 104, 108. Also by way of example, the at least one photodetector array 114, may be one array of photodetectors that are responsive to both wavebands. Also, the first and second photodetectors 124, 126 may be placed in a coplanar arrangement on one photodetector array.

The first and second photodetectors 124, 126 may be photovoltaic (such as photodiodes or other types of devices that generate an electric current due to absorption of light photons) or photoconductive (such as micro-bolometers or other types of devices having an electrical resistance that changes due to absorption of light photons). The photoconductive photodetectors often have a larger time constant and are often slower to react to light photons than photovoltaic photodetectors. However the photovoltaic photodetectors often require cooling to lower temperatures than photovoltaic photodetectors, although both technologies will enjoy improved performance with cooling.

Silicon-based photodetectors may not efficiently detect wavelengths greater than 1 um. Therefore silicon-based photodetectors are generally used to detect wavebands in the visible range (e.g., 400 nm to 750 nm) or NIR range (750 nm to 1 μm). Moreover, non-silicon-based photodetectors are often used as photodetectors for the detection of light in the infrared (IR) ranges, such as the SWIR range, the MWIR range or the LWIR range. Examples of non-silicon photodetector materials that support fabrication of photovoltaic or photoconductive IR photodetectors include: InGaAs, GaAs, GaSb, InSb, InAs, HgCdTe, and Ge. The use of non-silicon photodetectors 124 responsive to SWIR and longer wavelengths vastly improves the capability of the laser emitting within the SWIR waveband (e.g., LiDAR system) 102 to penetrate fog, snow, rain and other obscurants. Additionally, the use of non-silicon photodetectors 126, greatly improves the image acquisition device to detect animate and inanimate objects through such obscurants.

However, such non-silicon photodetectors 124, 126 should be cooled to minimize thermally generated current, reduce intrinsic photodetector noise and increase signal-to-noise-ratios. More specifically, such non-silicon IR photodetectors should be cooled within a range of 77 to 180 Kelvin by the active cooler 324.

The combination of the at least one photodetector array 114 and the ROIC 116 comprise the FPA 112. The basic function of the ROIC 116 is to accumulate and store the first and second photodetector photocurrents (i.e., the first and second photodetector output signals) from each of the first and second photodetectors 124, 126 and to transfer the resultant signal onto output ports for readout.

The ROIC 116 is operatively coupled to a printed circuit board (PCB) 130. The PCB 130 and ROIC 116 are coupled electrically through, for example, trans-silicon via (not shown) and are bonded together by a ball grid array 128. However, other packaging technologies, such as wire bonds or the addition of an interposer substrate, may also be used to couple the ROIC 116 to the PCB 130.

Figure 5:
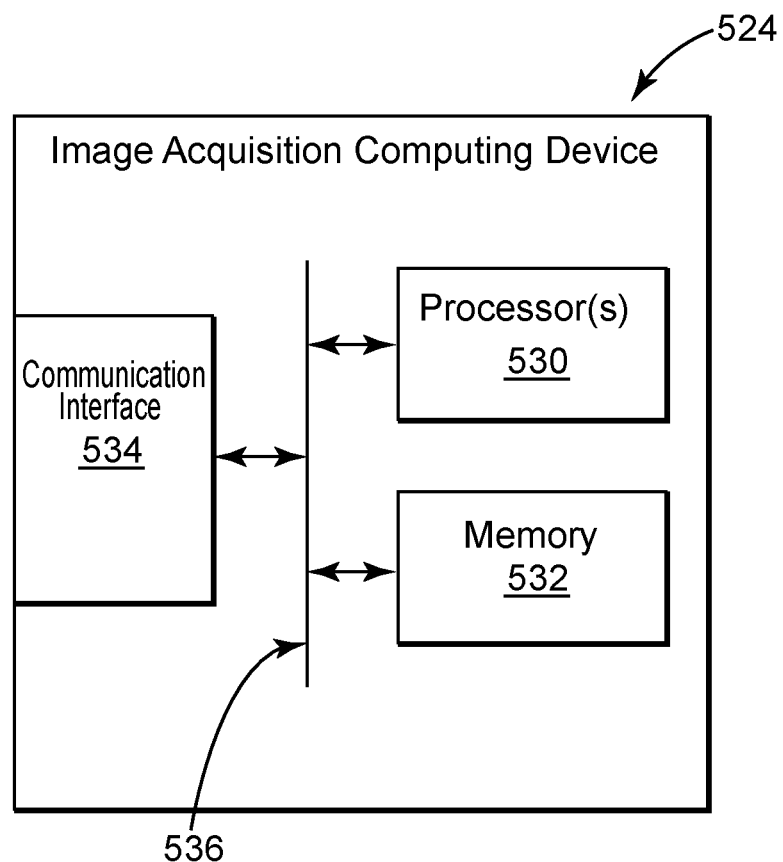
FIG. 5 is a simplified block diagram of an exemplary embodiment of an image acquisition computing device in accordance with the present invention.

The PCB 130 is in electrical communication with, or includes at least a portion of, an image acquisition computing device 524 (best seen in FIG. 5). The PCB 130 supports the functions of the FPA 112. The PCB 130 is also operatively coupled to the laser 102 via, for example, connecting line 142. In one example, the laser 102 is located on the PCB 130. The PCB 130 may send an initiation signal (i.e., a "ping") to the laser 102 to commence generating first photons 104 (e.g., output pulses of first photon 104) from the laser 102. The PCB 130 may simultaneously start, for example, an analog integrator (not shown) to measure the time of flight (ToF) that a pulse of first photons 104 travels from the laser 102 to the object 106 and back to the acquisition device 100. Accordingly, in this example, each first photodetector 124 will receive ToF data from the first photons 104 that strike it, while each second photodetector 126 will receive intensity data from each second photon 108 that strikes it.

In this example, the PCB 130 and FPA 112 are cooled by an active cooler 132. The active cooler 132 may be, by way of example, a Thermo-Electric Cooler (TEC), or a cryocooler device such as a Stirling cooler. The active cooler 132 is passively cooled and in conductive contact with heat sink 134. To optimize cooling of the FPA 112 the area around the FPA 112 is held in a vacuum and enclosed by an enclosure 136. The enclosure 136 may be, for example, a type of a Dewar. The first and second photons 104, 108 couple to the FPA 112 through a window, which in this example is an infrared window, 138. The infrared window 138 preserves the insulating vacuum and passes infrared energy. Power and signals are passed to and from the FPA 112 and PCB 130 via a vacuum sealed connector 140.

Figure 2:
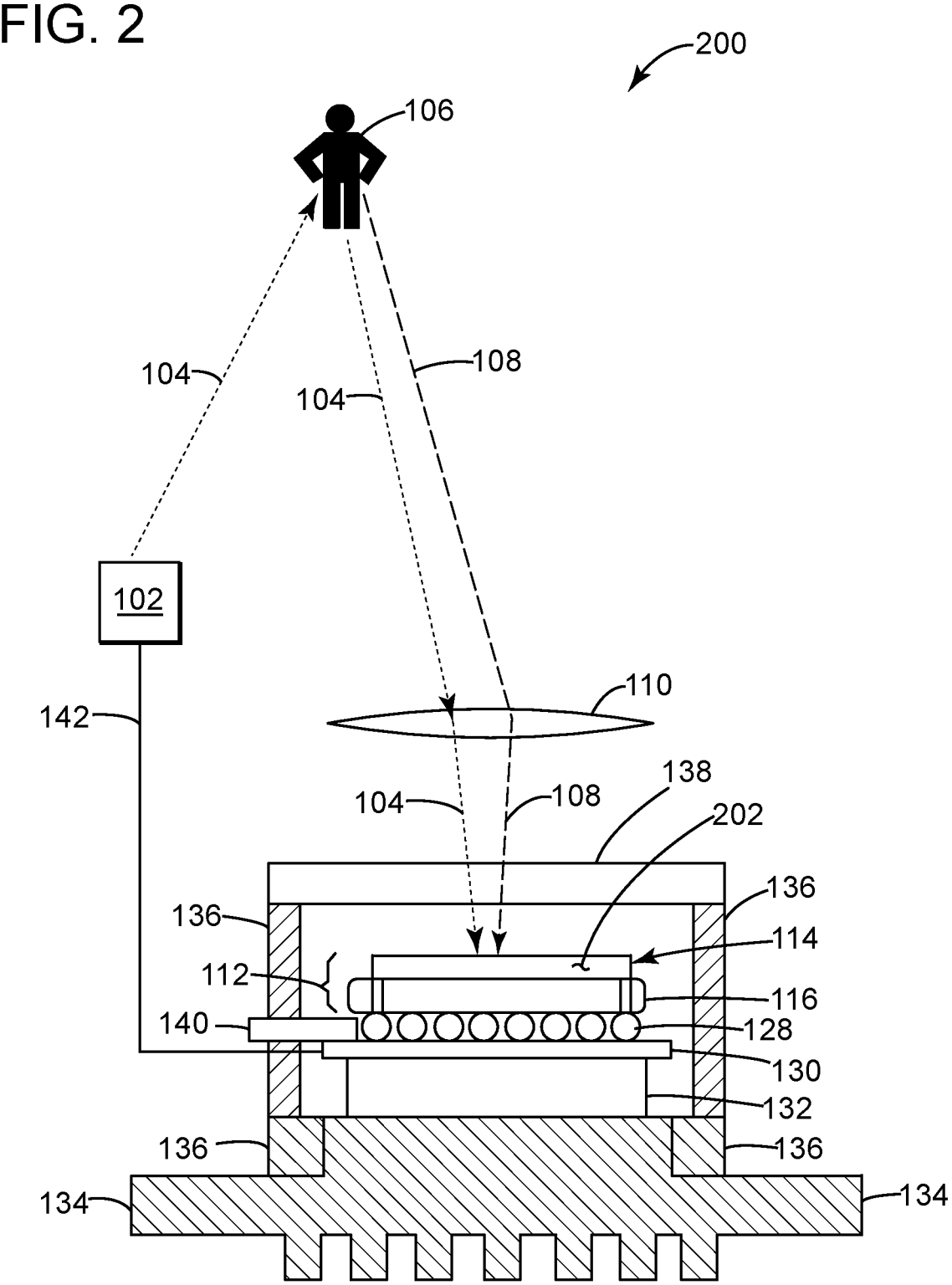
FIG. 2 is a simplified schematic illustration of another exemplary two-waveband image acquisition device in accordance with the present invention.

Referring to FIG. 2, a simplified schematic illustration of another exemplary two-waveband image acquisition device 200 in accordance with the present invention is depicted. In image acquisition device 200, the at least one photodetector array 114 is composed of a plurality of Colloidal Quantum Dots (CQD) 202. CQDs 202 are tiny semiconductor particles a few nanometers in size, having optical and electronic properties. Many types of CQDs, when excited by electricity or light, emit light at frequencies that can be precisely tuned by changing the dots' size, shape and material, therefore enabling a variety of applications. Conversely, CQDs can be made responsive to light, defined by the dots' size, shape and material, so that the CQD material produces electric current in response to illumination.

The CQDs 202 may be applied directly to the ROIC 116 in a single layer to form the FPA 112. The photosensitive CQDs 202 may be operable to detect both the first and second photons 104 and 108 that pass through the infrared window 138. Alternatively, the CQDs 202 may be applied in a first layer of CQDs and second different layer of CQDs (not shown), which are stacked together. The first layer of CQDs may be sensitive to the first light photons 104 and the second layer of CQDs may be sensitive to the second light photons 108, much like the first and second photodetectors 124, 126 of FIG. 1.

The rest of the image acquisition device 200 is substantially the same as the image acquisition device embodiment 100 in FIG. 1 and comprises the ROIC 116 coupled to the PCB 130 via ball grid array 128, an active cooler 132 coupled to the PCB 130, and a heat sink 134 coupled to the active cooler 132. The FPA 112 is enclosed by the enclosure 136 that, together with the infrared window 138 provide a vacuum sealed area around the FPA 112.

One advantage that the CQDs 202 have over other non-silicon materials, is that they do not have to be cooled as much to minimize thermally generated currents and enhance signal to noise ratios. For example, the CQDs 202 may only have to be cooled to within a range of 200 to 270 Kelvin for acceptable image generation.

The two-waveband image acquisition devices 100, 200 may include other types and/or numbers of devices, elements, and/or components in other configurations, such as additional optics and additional circuitry, by way of example only. The integrated LiDAR and thermal image acquisition devices 100, 200 provide a device that advantageously provides a single FPA 112 that combines LiDAR with thermal imaging. The image acquisition devices 100, 200 may be used to achieve higher performance object identification in applications, such as autonomous vehicles, by way of example only. The image acquisition devices 100, 200 may be employed in autonomous vehicles, military applications, as well as for space-based platforms and airborne surveillance systems, by way of example only.

Figure 3:
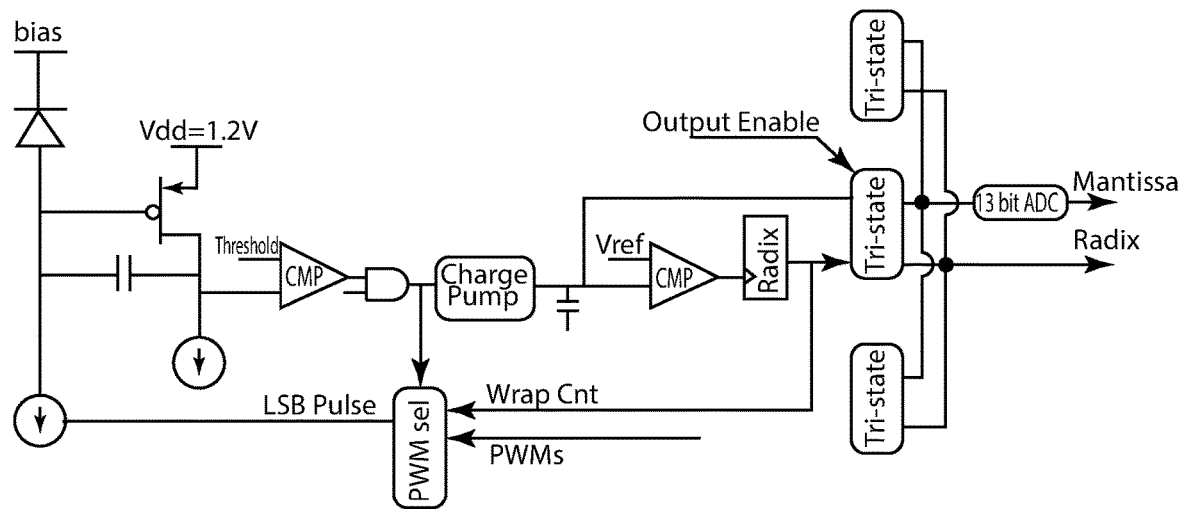
FIG. 3 is a simplified schematic of an exemplary embodiment of a unit cell of digital photodetector architecture of an at least one photodetector array of the two-waveband image acquisition device in accordance with the present invention.

Referring to FIG. 3, a simplified schematic of an exemplary embodiment of a unit cell of digital photodetector architecture of the at least one photodetector array 114 in accordance with the present invention is depicted. The embodiment shown in FIG. 3 represents the thermal detection mode of the integrated LIDAR and thermal image acquisition device 100. The digital photodetector architecture in this mode may provide in-photodetector $\log_2$ analog-to-digital conversion (LADC) as disclosed in U.S. Pat. No. 9,917,593, the disclosure of which is incorporated herein by reference. In one example, the flash LIDAR architecture re-tasks existing blocks in the unit cell to measure ToF with about 120 ps resolution, as discussed in further detail below, and as shown in FIG. 3. This single multifunctional unit cell can produce ToF 3D point cloud information and thermal 2D intensity imagery. While the unit cell is shown as a single-ended signal chain, this is not intended to be limiting. Those skilled in the art will notice that that some, or part, of the unit cell can be converted to fully differential signaling to improve specifications such as the signal-to-noise ratio (SNR) or dynamic range (DR), for example.

In this example, the digital photodetector architecture provides high frame rates and power efficiency over an extended dynamic range (DR). The digital photodetector architecture achieves the high-power efficiency by adaptively changing the least significant bit (LSB) size per photodetector based on photodetector intensity. In the following example, the digital photodetector architecture utilizes direct injection from the at least one photodetector array 114 to drive a capacitive trans-impedance amplifier (CTIA) that is used as an error integrator. The error integrator output is then passed through a comparator that generates a digital signal that is fed back to the error integrator input to achieve extremely high linearity. This structure is configured to produce a pulse density modulated sigma-delta modulator (SDM) output, that is then integrated, using an analog charge pump into a capacitor with 13 bit resolution, to form the mantissa. A 3 bit digital radix counter tracks integrator overflows and controls the LSB size. The 16 bit digital output has an eight segment piece-wise linear $\log_2$ response that is easily converted back to 21 linear bits using simple linear math. The error integration capacitor is sized for approximately 75 µV per photon to achieve approximately 3 photon sensitivity at the output of the analog-to-digital converter (ADC).

In this example, the closed-loop SDM current feedback may be time multiplexed to "skim off" the DC photodetector bias currents and background scene temperature, further improving sensitivity by lowering the noise equivalent delta temperature (NEDT). The skimming feature is not required for SWIR mode given that optical filtering will greatly attenuate background illumination. Skimming of the background scene temperature is very effective for the wide band MWIR mode of operation.

The digital photodetector architecture may integrate the analog error, not the actual signal. In this example, the error integrating capacitor does not define the LSB size, and can be optimized for an SNR independent of the DR. The over-sampled pulse-density modulated digital output of the photodetector is linearly integrated, and the 3 bit radix may dynamically control the amount of charge that is fed back, changing the closed loop gain and the LSB size. Controlling the LSB size based on eight octaves of input signal level enables a 13 bit equivalent integrator to cover a 21 bit DR while consuming the power of a 13 bit ADC.

Using a dynamic LSB also enables shorter integration times than a traditional linear ADC. A linear 21 bit fully digital photodetector would take $2^{21}$ counts to integrate from a reset value of zero. In this example, the LADC utilized for the digital photodetector architecture herein takes only $8 \times 2^{13}$ or $2^{16}$ clock cycles to cover the same 21 bit DR ($1/32^{nd}$ of the integration time and power).

In thermal mode, the feedback current sink may be controlled by a pulse width modulator controller, which applies the DC current (sets the minimum pulse width) before applying the digitized signal. The current pulse width is then extended based on the digital feedback value multiplied by the per photodetector radix (LSB) value. The 3 bit radix can extend the feedback current pulse by 1, 2, 4, 8, 16, 32, 64, or 128 charge units.

The use of current feedback, as opposed to voltage feedback, (including reset to zero) is advantageously and inherently current limiting. Active current limiting improves immunity to shorted photodetectors, including fabrication defects or optical threats. With voltage feedback, a single shorted photodetector can cause excessive voltage drop on power buses, which can corrupt a large area around the shorted photodetector, or even cause fusing of local power busing.

Figure 4:
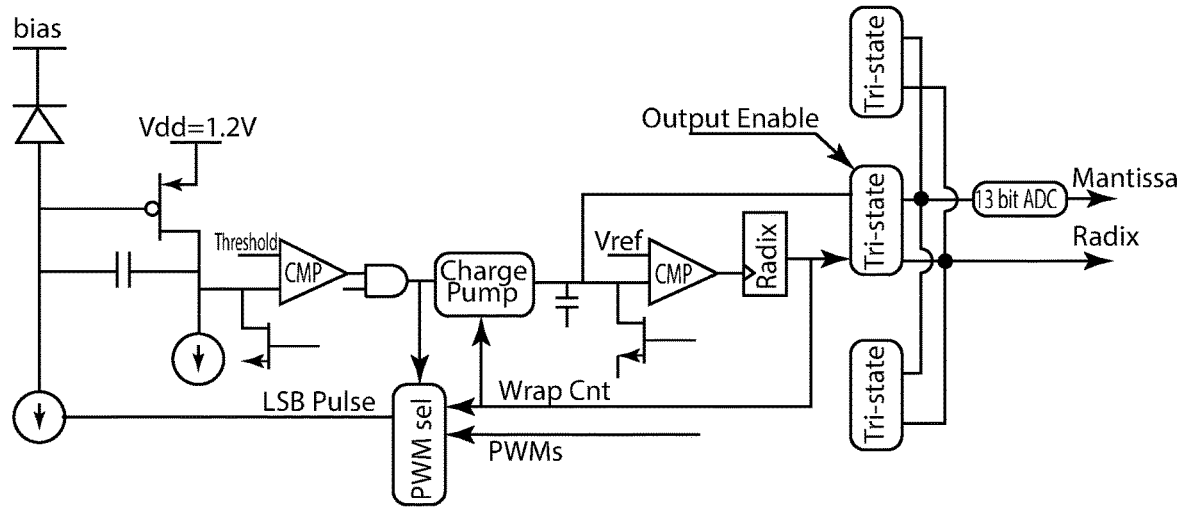
FIG. 4 is a simplified schematic of another exemplary embodiment of a unit cell of digital photodetector architecture of the at least one photodetector array in accordance with the present invention.

Referring to FIG. 4, a simplified schematic of another exemplary embodiment of a unit cell of digital photodetector architecture of the at least one photodetector array 114 in accordance with the present invention is depicted. The embodiment shown in FIG. 4 represents the LIDAR mode of the integrated LiDAR and thermal image acquisition device 100. Unlike "scanning" LiDAR, LiDAR mode may use for example only a 1 ns to 4 ns "flash" from a pulsed laser to illuminate the field of view and measure the ToF back to each photodetector simultaneously. This can be accomplished by reconfiguring the blocks already existing in the LADC architecture shown in FIG. 3. The architecture in FIG. 4 is the same as in FIG. 3, except that the photodetector architecture in FIG. 4 uses a range gate as an input to the charge pump to measure ToF instead of a pulse-density modulated intensity signal. The mode selection of thermal imaging or LiDAR can be made on a frame-to-frame basis.

Referring again to FIG. 1, in one example, the at least one photodetector array 114 is specifically designed to be broadband from 850 nm to 3000 nm, or another example, from 850 nm to 5000 nm. This enables the FPA 112 to work with multiple laser illuminators 102, and to be optimized per application by the addition of optical filter coatings on the lens 110.

In one example, when the "flash ping" is detected by an internal optical pickoff, a digital range gate start (RGS) trigger counter is started. In another example, the RGS trigger is stared based on an electronic signal, such as a signal sent to the illumination source 102, such as a laser, to commence an output pulse. When the RGS asserts, the charge pump current to the mantissa integrator is turned on, and stays on, until the return pulse is detected. The error integrator amplifies the incoming signal, and when it detects the reflected ping (when the threshold of the SDM comparator is crossed), that photodetector's integration is halted. At the end of a range gate window, all integration is halted, regardless of whether the reflected ping was detected by any particular photodetector, and the voltage across the capacitor in the mantissa integrator is linearly proportional to the ToF for that photodetector. The range gate start and end time may be optimized to extend the total operational range of the integrated LiDAR and thermal image acquisition device 100, and to enable 3D imaging through obscurants such as camouflage netting, by way of example only, by ignoring data from particular ranges such as the near field or the far field. The range gate window timing supports acquisition times limited only by the ToF (660 ns per 100 m) and the readout time.

False detection can be greatly reduced, and accuracy of detection enhance, by adding a dynamic threshold generator to vary the threshold of the SDM comparator (also known as a leading-edge discriminator) over the flight time to match the expected receive pulse intensity. This is an improvement over use of an avalanche photodiode (APD) which has a fixed gain, and in Geiger mode, cannot perform dynamic thresholding. A dynamic threshold exploits the linear nature of the CTIA input stage and the square nature of the pulse intensity decay with distance. When the maximum range time has expired, all remaining integration is halted. The resulting voltage on each photodetector's mantissa integrator is proportional to the ToF.

Alternatively, the SDM comparator may be replaced with a constant-fraction discriminator (CFD) to greatly reduce the amount of amplitude walk in the received pulse intensity, by way of example. Rather than sensing when its input signal crosses a certain threshold, a CFD is designed to trigger at a fixed time after its input signal has reached a constant fraction its maximum amplitude. As long as the input pulses have a similar shape (rise time), the CFD output will be independent of the input pulse amplitude. Amplitude and rise time compensated (ARC) timing techniques may also be added to the CFD, for example, to minimize the effects of input signal rise time variation. This can be used advantageously to improve the range resolution by eliminating variations inherent in more simplistic techniques.

The at least one photodetector array 114 is optionally integrated with a low noise, high gain correlated double sampled (CDS) sense amplifier, as disclosed in U.S. Pat. No. 9,787,923, the disclosure of which is incorporated herein by reference in its entirety. By way of example, the at least one photodetector array 114 may be "wafer stacked" to the CDS amplifier. The CDS amplifier cancels the amplifier offset and noise at the input of the at least one photodetector array 114, allowing the amplifier to apply gain and mimic the sensitivity of a Geiger-mode APD. Since the CDS amplifier signal path is highly linear, it does not suffer from the recovery time issue of Geiger-mode APDs. The CDS amplifier may also serve as the error integrator stage of an SDM ADC for photon counting as well as the input for ToF pulse detection.

In the LiDAR configuration, the input stage to the CDS amplifier may function as a high-gain low-noise amplifier, similar to a linear mode APD. DC current skimming is disabled since it is not necessary for narrow band photodetectors with low dark currents. The use of correlated double sampling cancels the amplifier noise at the photodetector input using a single capacitor. Since the low noise CDS amplifier direct injection capacitor integrates the error and not the full-scale signal, it can be sized to count single digit photons, as required for long-range LIDAR applications.

The die-bond interface (DBI) 118 couples the at least one photodetector array 114 to the ROIC 116. In one example, the at least one photodetector array 114 has at least one shared connection to the ROIC 116. In another example, each layer of each photodetector in the at least one photodetector array 114 has at least one independent connection to the ROIC 116. In one example, two die bond interface bumps of the DBI 118 are provided per photodetector site to allow for the simultaneous capturing of the thermal image frame and the LiDAR image frame. In another example, a single die bond interface bump in the DBI 118 is used per photodetector array site. In this example, the active photodetector (LiDAR or thermal) is selected using the bias applied to the at least one photodetector array 114, but only one photodetector (i.e., thermal or LiDAR photodetector) can be active at a time, and the frames are captured sequentially. In one example, the DBI 118 includes dies that are heterogeneous to each other to allow for the use of flash LiDAR. The LiDAR and thermal frames may be captured in an alternating or toggle fashion, but in many applications the LiDAR frames may constitute a small fraction of the image train given its relatively quick "pulse and gate" period as compared to the relatively long integration time of the thermal channel. Furthermore, it is possible to configure the single FPA 112 in such a way as to configure some part of the LiDAR and thermal photodetector arrays 120, 122 to be photosensitive, while other parts are not.

In this example, the ROIC 116 is a silicon based ROIC, although other materials known in the art may be utilized. The ROIC 116 is configured to generate a LIDAR image frame and a thermal image frame based on signals received from the at least one photodetector array 114. The ROIC 116 is configured to digitize the LIDAR 3D point-cloud image frame and a thermal image frame of the region of interest received from the at least one photodetector array 114.

The ROIC 116 may aggregate charge accumulated across two or more contiguous photodetectors in a process known as "binning." The present technology may advantageously utilize the binning technique, as it is possible to configure the ROIC 116 such that each photodetector can be controlled independently. In some applications it may be desirous to reduce the image size produced, or increase the frame rate, at the expense of spatial resolution. In one example, the ROIC 116 may combine a block of four photodetectors into one, thereby reducing the image size produced by a factor of four. Another added benefit is a perceived boon to the signal to noise ratio. This technique may be employed within the LiDAR photodetector array 120, the thermal photodetector array 122, or both, and may be used at anytime deemed advantageous.

Referring to FIG. 5, a simplified block diagram of an exemplary embodiment of an image acquisition computing device 524 in accordance with the present invention is depicted. The image acquisition computing device 524, in this example, includes one or more processor(s) 530, a memory 532, and/or a communication interface 534, which are coupled together by a bus 536 or other communication link, although the image acquisition computing device 524 can include other types and/or numbers of elements in other configurations. In one example, the image acquisition computing device 524 is a microcontroller located on the PCB 130 and is integral to the integrated LiDAR and thermal image acquisition device 100, although in other examples, the image acquisition computing device 524 may be separate from the integrated LiDAR and thermal image acquisition device 100.

The processor(s) 530 of the image acquisition computing device 524 may execute programmed instructions stored in the memory 532 for the any number of the functions described and illustrated herein. In one example, the processor(s) 530 receive digitized LiDAR image frames and thermal image frames of a region of interest from the ROIC 116, process the LiDAR image frames and the thermal image frames to detect the one or more objects of interest located in the region of interest, and correlate the detected one or more objects of interest between the LIDAR image frames and the thermal image frames to identify the one or more objects of interest based on the correlation between the LIDAR image frames and the thermal image frames. The processor(s) 530 may include one or more CPUs, graphics processing units (GPUs), or general-purpose processors with one or more processing cores, for example, although other types of processor(s) can also be used. The processor(s) 530 may also be artificial intelligence (AI) processor(s) that include deep learning technology, such as neural networks, for example. In an embodiment, the processor(s) 530 may include a tensor processing unit (TPU) to process frame data using deep learning techniques, including neural networks.

The memory 532 stores these programmed instructions for one or more aspects of the present technology as described and illustrated herein, although some or all of the programmed instructions could be stored elsewhere. A variety of different types of memory storage devices, such as random-access memory (RAM), read-only memory (ROM), hard disk, solid state drives, flash memory, or other computer readable medium which is read from and written to by a magnetic, optical, or other reading and writing system that is coupled to the processor(s), can be used for the memory 532.

Accordingly, the memory 532 of the image acquisition computing device 524 can store one or more applications or programs that can include computer executable instructions that, when executed by the image acquisition computing device 524, cause the image acquisition computing device 524 to perform actions described and illustrated below with reference to FIG. 6. The application(s) can be implemented as modules, threads, pipes, streams, or components of other applications. Further, the application(s) can be implemented as operating system extensions, module, plugins, or the like.

Even further, the application(s) may be operative in a cloud-based computing environment. The application(s) can be executed within or as virtual machine(s) (VM[s]) or virtual server(s) that may be managed in a cloud-based computing environment. Also, the application(s) may be running in one or more VMs executing on the image acquisition computing device.

The communication interface 534 operatively couples and communicates between the image acquisition computing device 524 and the ROIC 116. In one example, the communication interface 534 is a single CSI-2 interface for receiving the LIDAR image frames and the thermal image frames, although other interface devices may be employed. In this example, the 2D and 3D frames are interlaced in the output data stream to the image acquisition computing device 524 for image data processing. The interlacing may be periodic or aperiodic. In another example, dual CSI-interfaces are employed with each of the dual interfaces dedicated to either 2D or 3D for full simultaneous operation. In yet another example, one frame of data could simultaneously contain a plurality of thermal and distance data fields similar to RGB+D file formats, but with IR band colors representing temperature variations, for example each photodetector of the thermal image could have 1D, 2D, or 3D range data associated with it as provided by the LiDAR.

Through the use of an in-photodetector LADC, as described above with reference to FIGS. 3 and 4, the photodetector multiplexing and analog-to-digital conversion no longer limit the frame rate. The CSI-2 interface eliminates the need for a custom digital FPGA interface and enables the use of high performance commercial-off-the-shelf (COTS) processors (Nvidia Jetson TX-2 or Qualcomm Snapdragon 845) for non-uniformity correction (NUC), image fusion and deep learning. Each four lane CSI-2 is capable of 10 Gbps, which equates to greater than 120 FPS for a 2048×2048 photodetector array with 16 bit/photodetector resolution. For a 256×256 photodetector array, frame rates of approximately 8000 FPS are possible. The high frame rate could also be used to capture LADAR data using multiple range gate starts to create a multiple surface 3D point cloud for imaging through obscurants.

CSI-2 supports numerous range and intensity photodetector formats. The ROIC 116 could support the 12 bit, 16 bit and 20 bit per photodetector data streams, with optional $\log_2$ compression on a "raw" 16 bit data stream. For example, the 16 bit $\log_2$ CSI-2 data stream encodes a 21 bit DR with approximately 30% data rate (and power) compression. The host processor may perform the piecewise linear inverse-$\log_2$ transformation in software on the GPU of the TX2 to reconstruct a fully linear output.

In another example, the image acquisition computing device 524 is a highly integrated microcontroller device with a variety of onboard hardware functions, such as ADCs, digital-to-analog converters (DACs), serial buses, general purpose I/O pins, RAM, and ROM. The microcontroller may be located on PCB 130, by way of example.

Although the exemplary image acquisition computing device 524 is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for the image acquisition computing device 524. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, packet data networks (PDNs), the internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 6:
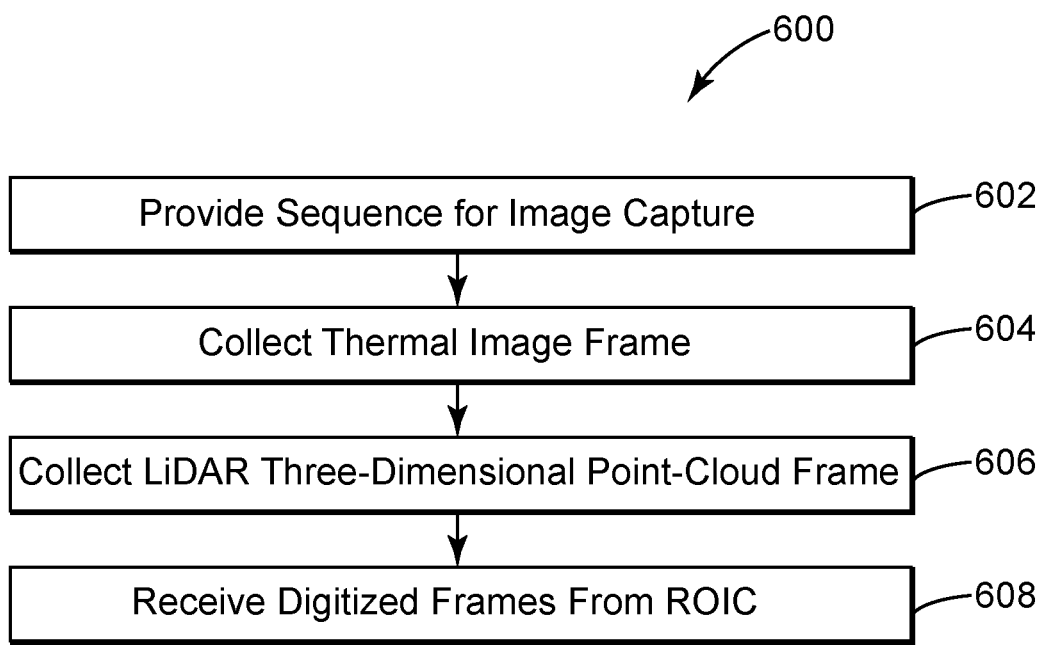
FIG. 6 is an exemplary flowchart of a method of operation of an integrated LiDAR and thermal image acquisition device in accordance with the present invention.

Referring to FIG. 6, an exemplary flowchart of a method of operation of the integrated LiDAR and thermal image acquisition device 100 in accordance with the present invention is depicted at 600. First, in step 602, the image acquisition computing device 524 provides a sequence for image capture. In this example, the image acquisition sequence includes a series of 2D thermal and 3D LiDAR image captures.

Next, in steps 604 and 606, the thermal image frame and the LiDAR 3D point-cloud image frames are collected based on the sequence provided in step 602. The order of steps 604 and 606 is interchangeable.

In step 604 in this example, the thermal frame is collected using MWIR, which is largely radiated (thermal information exists without illumination). The integrators in the ROIC 116 are reset for each photodetector in the at least one photodetector array 114 in the frame. The photodetector array 114 is then configured for image intensity measurement to measure the thermal radiation. By way of example, frequency selection may be utilized to activate the thermal photodetectors 126 in the at least one photodetector array 114. In one example, the photodetectors in the photodetector array 114 are biased (photovoltaic or photoconductive) for thermal detection.

The at least one photodetector array 114 accumulates charge based on at least one of radiated and reflected thermal energy focused on the photodetector array 114 by the lens 110. The charge resulting from the radiated thermal energy focused onto photodetector array 114, and delivered to the ROIC 116, is integrated over an integration period. After a specified integration time, ROIC 116 stops integrating the charge from the photodetector array 114. The quantity of charge collected during the integration time is digitized by the ROIC 116. In step 606, the ROIC 116 then transfers the digitized thermal frame to the image acquisition computing device 524 using the communication interface 534, such as a CSI-2, by way of example only.

In step 606, the LiDAR frame is collected using SWIR. SWIR is utilized in this example as longer wavelengths require thicker absorbers and become unattractive for high frame rate flash LiDAR. Further, wavelengths less than 1.4 µm are highly reflected by water, which may be present within the region of interest and therefore present specular reflections, scatter or absorption that may degrade optical system performance, including LADAR. In one example, an illumination source with a 1.55 µm wavelength is utilized for the LiDAR ToF measurement. The integrators in the ROIC 116 are reset for each photodetector 124, 126 in the at least one photodetector array 114 in the frame. The photodetector array 114 is then configured for the ToF LiDAR measurement. By way of example, the photodetector array 114 is biased (photovoltaic or photoconductive) to be responsive to the SWIR band. Next, a light pulse or ping is initiated from illumination source 102. In one example, a mechanism may be located on the PCB 130 to initiate the light pulse (ping). The ping may be initiated on the ROIC 130 and signal the illumination source 102 located on the PCB 130. In one example, the illumination source 102 includes a sense output to more accurately indicate when the pulse is fired. The sense output may be fed back to the ROIC 116 to better control the start of ToF integration. In another example, the PCB 130 may include a device that generates the ping and sends the ping to both the illumination source 102 and the ROIC 116 in parallel. In one example, a 1 ns ping pulse, with an end ToF window of 1 µS and a 13 bit ADC, yields a 1 inch resolution from 1 to 500 feet. The temporal span defined by the start and end of the ToF window form a "range gate" over which the ToF measurement is responsive.

The light pulse is reflected off some or all features of some or all objects in the region of interest or scene, such as object 106, shown in FIG. 1, and light reflected back towards the device 100 is coupled back through the lens 110 to sites in the photodetector array 114. A calibrated current sink is initiated by the ping and is integrated into a capacitor for each photodetector 124. When the reflected light pulse is detected at the photodetector array 114, the current sink for that photodetector is stopped. After the specified max flight time is reached, all current sinks are stopped. The amount of voltage stored on the capacitor is digitized by the ROIC 116 for each photodetector 124 in the photodetector array 114 of the frame. The digitized voltage on the capacitor is linearly proportional to the ToF given the nature of the light's constant speed through a singular medium (light travels at approximately 1 ft/ns in air). The time for light to reach an object is half of the ToF. The digitized frame is then transferred, in step 606, from the ROIC 116 to the image acquisition computing device 524 over the communication interface 534, such as a CSI-2 interface.

In step 608, the collected 3D LiDAR point-cloud and the 2D thermal image frames of a region of interest, that were digitized by the ROIC 116, are provided to the image acquisition computing device 524 coupled to the ROIC 116 device. In one example, the 2D (thermal) and 3D (LiDAR) frames are interlaced in the output data stream to the image acquisition computing device 524 for image data processing.

Accordingly, examples of the present technology provide a two-waveband image acquisition device 100 having a single focal plane array 112 that combines SWIR wavelength (e.g., 1.55 μm) LiDAR, and MWIR wavelength thermal imaging that detects thermal variations within the region of interest, each capable of sustaining performance in many adverse conditions. By combining LIDAR and thermal imaging into a single FPA 112, there is no need to spatially register the two datasets through post processing techniques as necessary when combining multiple signals from multiple disparate sensors. Data from a single FPA 112 can be used to recognize, categorize, and distinguish living from non-living objects, even under inclement weather conditions. The result is a simpler and more economical system for improving categorizing objects in the vehicular environment that provides higher performance.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. An integrated LiDAR and thermal image acquisition device comprising:
   an infrared illumination source configured to provide infrared illumination over a region of interest;
   a focal plane array having a photodetector array comprising a plurality of LiDAR photodetectors and a plurality of thermal photodetectors;
   a lens to collect reflected infrared beams, based on the infrared illumination from the infrared illumination source, from one or more objects in the region of interest, and radiated thermal beams from the one or more objects in the region of interest, wherein the lens is configured to at least one of spectrally or spatially manipulate the reflected infrared beams and the radiated thermal beams onto the photodetector array;
   a read-out integrated circuit coupled to the photodetector array to receive signals from the photodetector array based on the reflected infrared beams and the radiated thermal beams, the read-out integrated circuit comprising:
   a range gate signal generating device;
   a discriminator responsive to the reflected infrared beams and the range gate signal to generate an array of signals proportional to the time-of-flight (ToF) between a first time when the infrared illumination is provided by the illumination device and a second time when the reflected infrared beams from the one or more objects in the region of interest are received by the photodetector array;
   a ToF analog-to-digital converter responsive to the array of signals from the discriminator to generate a digital ToF point cloud representative of the region of interest; and
   an intensity analog-to digital converter responsive to an intensity of at least one of the reflected infrared beams or the radiated thermal beams in the region of interest to generate a digital intensity image array; and a digital interface coupled to the ROIC and configured to generate at least one of a LiDAR image frame and LiDAR data and a thermal image frame and thermal data based on the digital ToF point cloud and the digital intensity image array.

2. The device of claim 1, wherein a wavelength of the infrared illumination is in the 1 μm to 3 μm short-wave infrared band.

3. The device of claim 1, wherein a wavelength of the infrared illumination is predominantly 1550 nm.

4. The device of claim 1, wherein the infrared illumination is temporally pulsed in at least one of a periodic manner and an aperiodic manner.

5. The device of claim 1, wherein the photodetector array is a two dimensional (2D) array.

6. The device of claim 1, wherein the photodetector array is a colloid quantum dot photodetector.

7. The device of claim 1, wherein the plurality of thermal photodetectors are configured to receive the radiated thermal beams in the 3 μm to 5 μm mid-wave infrared band.

8. The device of claim 1, wherein the plurality of thermal photodetectors are configured to receive the radiated thermal beams in the 8 μm to 14 μm long-wave infrared band.

9. The device of claim 1, wherein a photosensitivity of the plurality of LiDAR photodetectors and the plurality of thermal photodetectors is electronically controllable.

10. The device of claim 1, wherein the plurality of LiDAR photodetectors and the plurality of thermal photodetectors are co-located on the photodetector array and are constructed of a same photosensitive material.

11. The device of claim 1, wherein the plurality of LiDAR photodetectors and the plurality of thermal photodetectors are located on separate photodetector arrays physically located one predominantly atop of the other within an optical registration between the plurality of LiDAR photodetectors and the plurality of thermal photodetectors.

12. The device of claim 11, wherein the plurality of LiDAR photodetectors and the plurality of thermal photodetectors share an output pin and an output signal from the plurality of LiDAR photodetectors and the plurality of thermal photodetectors is selected using a bias voltage.

13. The device of claim 11, wherein the plurality of LiDAR photodetectors and the plurality of thermal photodetectors share one of a common anode or a common cathode.

14. The device of claim 1, wherein the photodetector array is fabricated using strained lattice techniques including T2SL and nBn.

15. The device of claim 1, wherein the read-out integrated circuit is time multiplexed between signal paths for signals based on the reflected infrared beams and the radiated thermal beams.

16. The device of claim 1 further comprising: a thermoelectric cooler (TEC) coupled to the focal plane array and configured to maintain the photodetector array at a temperature below ambient temperature to reduce noise from the photodetector array.

17. The device of claim 16, wherein the TEC is configured to maintain the photodetector array at a temperature below 233K (−40 C).

18. The device of claim 16, wherein the TEC is configured to maintain the photodetector array at a temperature below 173K (−100 C).

\* \* \* \* \*